United States Patent [19]

Patel

[11] 4,075,371
[45] Feb. 21, 1978

[54] WEAR RESISTANT ALLOY COATING CONTAINING TUNGSTEN CARBIDE

[75] Inventor: Mahesh S. Patel, Albertson, N.Y.

[73] Assignee: Eutectic Corporation, Flushing, N.Y.

[21] Appl. No.: 709,705

[22] Filed: July 29, 1976

Related U.S. Application Data

[62] Division of Ser. No. 594,943, July 11, 1975, Pat. No. 4,013,453.

[51] Int. Cl.² .............................................. B05D 1/08
[52] U.S. Cl. .................................... 427/224; 427/423
[58] Field of Search ................ 427/34, 423, 190, 191, 427/224; 29/195 A; 75/.5 R

[56] References Cited

U.S. PATENT DOCUMENTS

| | | | |
|---|---|---|---|
| 3,238,060 | 3/1966 | Quass et al. | 427/423 |
| 3,419,415 | 12/1968 | Dittrich | 427/423 |
| 3,455,019 | 7/1969 | Quass | 427/423 X |
| 3,496,682 | 2/1970 | Quass et al. | 427/423 X |
| 3,539,192 | 11/1970 | Prasse | 75/.5 R X |
| 3,606,359 | 9/1971 | McCormick | 29/195 A X |
| 3,617,358 | 11/1971 | Dittrich | 427/423 |
| 3,642,519 | 2/1972 | Tiner et al. | 427/34 |
| 3,814,447 | 6/1974 | Prasse et al. | 427/34 X |
| 3,896,244 | 7/1975 | Ellis et al. | 427/423 X |
| 3,936,295 | 2/1976 | Cromwell et al. | 427/34 X |

*Primary Examiner*—Ronald H. Smith
*Assistant Examiner*—Shrive P. Beck
*Attorney, Agent, or Firm*—Hopgood, Calimafde, Kalil, Blaustein and Lieberman

[57] ABSTRACT

A method and coating material are provided for improving the wear and abrasion resistance of a composite nickel-base hard facing alloy applied to metal substrates comprising the system Ni-Cr-Si-B having dispersed therein particles comprising tungsten carbide, the improvement residing in controlling the average particle size of tungsten carbide to below 10 microns, e.g. 0.1 to 10 microns, preferably an average size ranging from about 2 to 8 microns (such as 2 to 6 microns), at an average interparticle spacing of less than 15 microns, and preferably less than 10 microns, e.g. up to 5 microns, the hard facing coating produced being further characterized in that the coating exhibits metallographically a substantially uniform structure at the surface thereof with respect to said tungsten carbide particles.

5 Claims, 7 Drawing Figures

100 X

WEAR RESISTANT ALLOY COATING CONTAINING TUNGSTEN CARBIDE

This is a division of copending application Ser. No. 594,943 filed July 11, 1975, now U.S. Pat. No. 4,013,453.

This invention relates to a wear and abrasion resistant hard facing coating alloy and to a method for applying said coating alloy to a metal substrate in order to improve its surface properties.

STATE OF THE ART

Hard facing materials are widely used for applying a hard surface to metal substrates to protect the base metal against wear and tear by abrasion. A commonly used hard surfacing material is one that incorporates coarse hard particles, such as tungsten carbide, in a metal mixture in powder form, such that when the surface is coated with the hard facing formulation, the hard particles are dispersed through an alloy matrix.

It is known to apply hard facing overlays on metal substrates using gas torches which are adapted to deposit metal powder formulations on metal substrates by entraining the powder in the stream of burning gases issuing from the torch. A typical torch for that purpose is that illustrated in U.S. Pat. Nos. 3,190,560 which issued on June 22, 1965 and 3,262,644 which issued on July 26, 1966. The powder formulation is injected into the stream of burning gas and emitted from the torch in the fused state and applied to the metal substrate, the flame of the torch being applied to the deposited material to assure a uniform spreading of the coating material in the molten state.

A particular hard facing composition is one comprising a nickel-base alloy matrix powder (Ni-Cr-Si-B) having mixed therewith a relatively high loading of coarse particles of tungsten carbide, for example, tungsten carbide particles of average size of over 50 microns and generally 75 microns or more. A preferred composition generally is one containing 60% by weight of tungsten carbide in order to provide a relatively high density of carbide particles at or near the surface of the coating to assure maximum resistance to wear and abrasion.

While such hard facing coatings were acceptable from the viewpoint of providing adequate resistance to abrasion, a disadvantage of the coating was that the abrasion-resistant properties tended to be inconsistent due to segregation of coarse particles of tungsten carbide during the torch melting of the coating material on the metal substrate. In addition, the coating containing high loadings of tungsten carbide tended to be sensitive to thermal cracking and spalling due to the somewhat brittle nature of the coating following metallurgical bonding of the coating to the metal substrate.

OBJECTS OF THE INVENTION

It is thus the object of the invention to provide a hard facing tungsten carbide-containing coating powder composition which, when deposited upon a metal surface in the molten condition and solidified, is characterized by improved resistance to wear and abrasion at a carbide level substantially below the high levels heretofore employed.

Another object is to provide a metal substrate coated with a hard facing tungsten carbide-containing alloy layer metallurgically bonded thereto characterized by improved resistance to wear and abrasion.

A further object is to provide a method for producing a hard facing coating of a tungsten carbide-containing alloy characterized by improved resistance to wear and abrasion.

These and other objects will more clearly appear from the following disclosure and the accompanying drawing, wherein.

Figure 5:
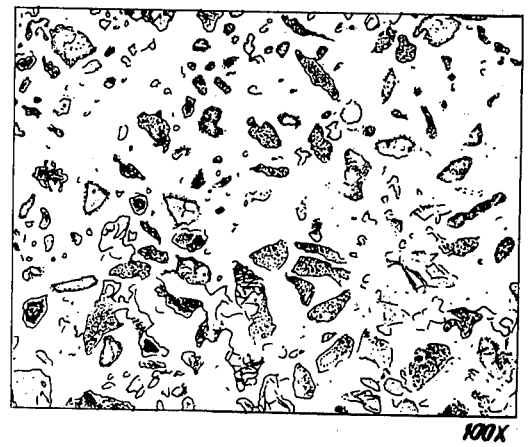
Figure 6:
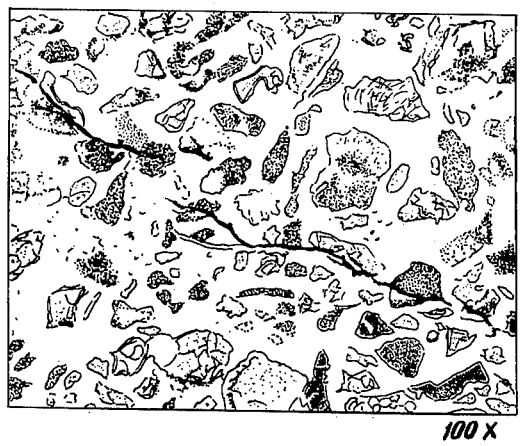
Figure 7:
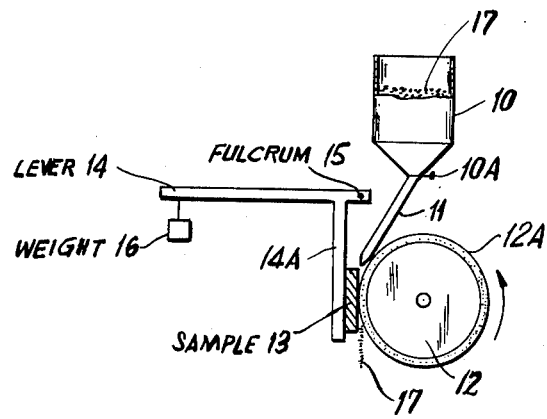

FIG. 5 is a representation of a photomicrograph taken at 100 times magnification of the cross section of a hard facing coating near the surface thereof showing the segregation of dispersed coarse particles of about 60 wt.% (about 43.5 v/o) in a nickel-base alloy matrix, the average size of the particles near the surface being about 60 microns, the coarser particles having settled further below the surface while the applied coating was still in the molten state;

FIG. 6 is a representation of a photomicrograph at 100 times magnification similar to FIG. 5 showing the sensitivity to cracking of a coating highly loaded with coarse particles of tungsten carbide; and FIG. 7 is a schematic of a wear tester.

STATEMENT OF THE INVENTION

In carrying out the broad aspects of the invention, I have found that I can improve the wear and abrasion resistance of nickel-base alloy coatings containing tungsten carbide by using substantially less tungsten carbide, provided the average size of the carbide particles is controlled in size to substantially below 50 microns, that is to say, not exceeding about 10 microns in average size, and preferably below 10 microns, and provided further that the tungsten carbide particles in the ultimate hard facing coating deposited on a metal substrate exhibit metallographically an interparticle spacing of less than about 15 microns and, preferably, less than 10 microns. Also, in carrying out the invention, I have found that metallographically the structure is substantially non-segregated compared to the structure obtained with coarse tungsten carbide particles. This will be apparent by comparing the metallographic structure of FIG. 3 (fine dispersion) with that of FIG. 5 involving coarse tungsten carbide particles in which segregation is clearly apparent.

I have found that I can obtain the desired metallographic structure in combination with markedly improved wear and abrasion resistant properties by employing a novel powder mixture as the starting material in producing the coating by flame spraying using gas torches of the type disclosed in U.S. Pat. No. 3,190,560 referred to hereinbefore.

Thus, one embodiment of the invention is directed to a composition of matter in the form of a powder mixture for use in the hard facing of metal substrates comprising a nickelbase alloy powder having substantially uniformly blended therewith a powder comprising agglomerates of nickel powder intimately combined with tungsten carbide powder, the amount of tungsten carbide in the agglomerates ranging from about 70% to 90% by weight, with the nickel powder in said agglomerates ranging from about 30% to 10% by weight, the ratio of the amount of agglomerates to said nickel-base alloy powder in the powder mixture being such that the total mixture has an average tungsten carbide content ranging from about 10% to 30% by weight of said mixture, the composition of the nickel-base alloy powder in the mixture comprising by weight about 2.5% to 20% Cr, about 0.5% to 6% Si, about 0.5% to 5% B, up to about 10% Fe and the balance essentially nickel.

The nickel powder-tungsten carbide agglomerates are produced by mixing finely divided nickel powder, e.g. average size of about 0.1 to 10 microns, with tungsten carbide powder of average size of preferably 0.1 to 10 microns, in the presence of an organic binder comprising a resin dissolved in a compatible volatile organic solvent, the amount of resin generally corresponding to about 2 to 3% by weight of the mixture on the dry basis. The use of resin binders is well known in powder metallurgy.

The foregoing is continuously mixed with slight heating (e.g. about 140° C) until dry, and the dried product screened, through, for example, a 150 mesh, preferably through 270 mesh (U.S. Standard) to provide an agglomerate powder, wherein each of the agglomerates is constituted of nickel powder in intimate combination with the tungsten carbide powder by virtue of the presence of the resin as the binding agent.

A preferred agglomerate is one containing about 80% by weight of tungsten carbide particles combined with nickel powder. Thus, 20% by weight of agglomerate of this composition when mixed with 80% by weight of nickel-base alloy powder produces a final costing composition containing 16% by weight of tungsten carbide which corresponds approximately to about 9%/o of tungsten carbide in the final coating dispersed through the nickel-base alloy matrix.

A second embodiment of the invention resides in a method for hard facing a metal substrate with an alloy coating material adapted to impart improved resistance to wear and abrasion, the method comprising flame spraying the aforementioned powder composition onto a metal substrate, maintaining a flame on the deposited hard facing alloy to assure a uniform molten deposit on said surface and then allowing the molten deposit to solidify, whereby a hard coating is obtained metallurgically bonded to the metal substrate characterized metallographically by a substantially non-segregated fine dispersion of hard particles comprising tungsten carbide of average size not exceeding about 10 microns dispersed through a nickel-base alloy matrix at an average interparticle spacing of less than about 15 microns, generally less than 10 microns.

A further embodiment of the invention resides in a wear and abrasion resistant metal substrate having a hard facing coating metallurgically bonded thereto, the coating comprising a nickel-base matrix alloy containing by weight about 2.5% to 20% Cr, about 0.5% to 6% Si, about 0.5% to 5% B, up to about 10% Fe and the balance essentially nickel, the matrix alloy having dispersed therethrough a substantially non-segregated fine dispersion of hard particles comprising tungsten carbide of average size less than about 10 microns at an average interparticle spacing of less than about 15 microns.

It has been found that, by working over the foregoing ranges of composition, a hard facing coating material is provided which contains substantially less tungsten carbide without sacrificing the wear and abrasion resistant properties of the coating. Moreover, it has been found that, by using substantially less tungsten carbide to obtain the same or better wear properties, the coating exhibits improved resistance to thermal cracking. The foregoing will be more clearly apparent from the details of the invention which are as follows.

DETAILS OF THE INVENTION

The wear and abrasion resistance of a coating relates generally to the Mohs hardness, which is a hardness parameter corresponding to the ability of a material to resist scratching when contacted by a harder material. The hardness scale ranges from 1 to 10 with talc at the bottom of the range equal to 1 and diamond at the top end of the range equal to 10, diamond being the hardest known substance on the Mohs scale. The Mohs hardness for tungsten carbide is slightly above 9.

Most nickel-base alloys have a Mohs hardness in the neighborhood of between 5 to 7 and, therefore, have certain limitations as to wear and abrasion resistant properties. The use of coarse particles of tungsten carbide as an additive to such alloys has substantially improved such properties for these alloys. The particle size of the carbide has generally exceeded 50 or 75 microns, e.g. 100 microns, in average size. Because of these sizes, the amounts employed were generally high, for example, 60% by weight, in order to obtain the desired resistance to wear and abrasion. Such high loadings, however, sacrificed the ductility of the coating for hardness, and thus, unless care was taken in producing the coating, it had a tendency to undergo thermal cracking. Moreover, during application of the coating in the molten state, the coarse particles of tungsten carbide tended to settle during the molten stage of the coating so that only the smaller particles remained near the surface at rather large interparticle spacings. It should be noted that tungsten carbide has a density of about 15.7 grams/cm$^3$ compared to the nickel-base alloy which is in the neighborhood of about 8.2 grams/cm$^3$.

Figure 3:
FIG. 3 is a representation of a photomicrograph taken at 100 times magnification of the cross section of a hard facing coating in accordance with the invention showing a uniform substantially non-segregated dispersion in a nickel-base alloy matrix of 16 wt.% tungsten carbide particles (about 9 v/o) average size of about 4 to 5 microns.

The foregoing will be apparent by referring to FIG. 3 which shows a photomicrograph of a coating at 100 times magnification taken substantially below the surface of the coating and which depicts coarse particles of tungsten carbide of about 100 microns average size at an average interparticle spacing of about 30 to 50 mircons.

Substantially the same composition photographed near the surface of the coating is depicted in FIG. 6 taken at 100 times magnification which shows smaller particles of tungsten carbide (e.g. 20 to 60 microns) at interparticle spacings range from approximately 50 to 100 microns. A disadvantage of this structure at the surface of the coating is that considerable matrix metal between the particles is exposed to wear such that the matrix metal is selectively worn away to the extent that hard particles are removed from or fall out of the matrix due to such selective wearing of the matrix metal.

I have found that, by using substantially smaller tungsten carbide particles in a special powder blend and by employing said blend as a flame spray coating, I obtain the desired properties using substantially less tungsten carbide. FIG. 3 is a representation of a photomicrograph taken at 100 times magnification of the nickel-base alloy coating of the invention, showing only 16% by weight of tungsten carbide (about 9 v/o) having an average particle size for the majority of the particles of about 4 to 6 microns at an average interparticle spacing of less than about 10 microns. By using the powder blend described hereinbefore, I have found that I can minimize segregation of the hard particles, especially for average particle sizes of the hard phase ranging up to about 10 microns. A substantially non-segregated structure provides the closest to the ideal spacing for a particular size range and for a particular volume range of particles.

Figure 1:
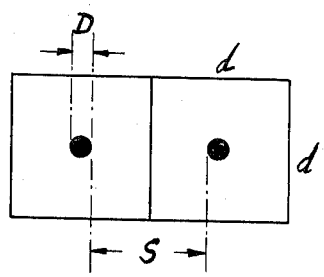
FIG. 1 is a diagram illustrating interparticle spacing for an ideal dispersion between two particles each occupying the center of a unit cube.

This will clearly appear by referring to FIG. 1 which is a diagram showing the spacing of two particles in an ideal system in which each particle (assumed as spheres) occupies the center of a unit cube, two unit cubes being adjacently arranged as shown. The following definitions are given:

$S$ = interparticle spacing between the two particles (1)

$D$ = average diameter of carbide particle (2)

$d$ = size of unit cube (3)

$fp$ = volume fraction of the carbide particle relative to the unit cube (4)

The interparticle spacing is determined for the ideal system as follows:

Vol. of carbide particle = $\pi D^3/6$ (5)

Vol. of unit cube = $d^3$ (6)

Therefore, $fp \cdot d^3 = \pi D^3/6$ (7)

$$d = \sqrt[3]{\frac{0.525}{fp} D^3}$$

or $$d = D \sqrt[3]{\frac{0.525}{fp}}$$ (8)

$S = d - D$ (9)

$$S = D \sqrt[3]{\frac{0.525}{fp}} - D$$

or $$S = D \left[ \sqrt[3]{\frac{0.525}{fp}} - 1 \right]$$ (10)

As stated hereinbefore, the final coating material may contain 10% to 30% by weight of tungsten carbide. This corresponds approximately to a volume range of about 5 v/o to 20 v/o of tungsten carbide. It has been found that, by using small sizes of tungsten carbide of less than 10 microns over the foregoing volume range, a substantially uniform dispersion is obtained at small interparticle spacings. This will be clearly apparent by using Equation (10) hereinabove and solving for S for average particle sizes of 4 and 6 microns, respectively. The data obtained are summarized in the table below as a function of volume fraction $fp$ and diameter D of the particle.

| fp | D Microns | S Microns | D Microns | S Microns |
|---|---|---|---|---|
| 0.01 | 4 | 10.88 | 6 | 16.3 |
| 0.05 | 4 | 4.8 | 6 | 7.2 |
| 0.07 | 4 | 3.8 | 6 | 5.8 |
| 0.09 | 4 | 3.2 | 6 | 4.8 |
| 0.11 | 4 | 2.7 | 6 | 4.1 |
| 0.14 | 4 | 2.2 | 6 | 3.4 |
| 0.18 | 4 | 1.7 | 6 | 2.5 |
| 0.20 | 4 | 1.5 | 6 | 2.3 |

As will be noted, the preferred average sizes of 4 and 6 microns, respectively, provide small interparticles spacings over a volume fraction range of 0.05 to 0.20 (i.e., 5 v/o to 20 v/o of less than 10 microns. It will also be noted that, at a volume fraction of 0.09 (9 v/o), which corresponds approximately to 16% by weight of tungsten carbide, the interparticle spacing for the 4 micron average size particle is 3.2 microns and for the 6 micron average size particle, about 4.8 microns.

Figure 2:
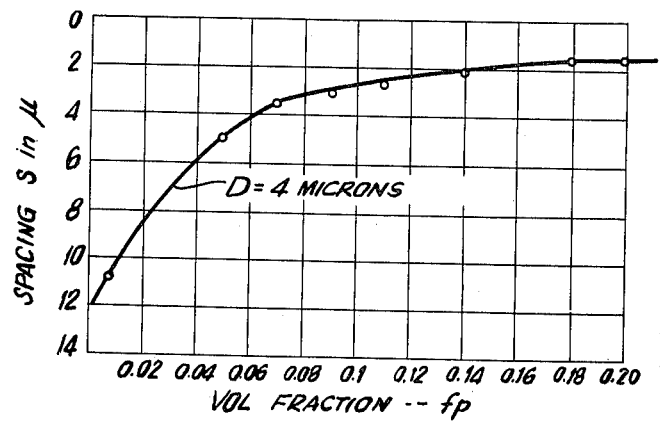
FIG. 2 is a curve for an ideal dispersion showing the variation in interparticle spacing of hard particles of about 4 microns average size as a function of volume fraction of said particles dispersed through an alloy matrix.
Figure 4:
FIG. 4 is a representation of a photomicrograph taken at 100 times magnification of the cross section of a hard facing coating at substantially below the surface of the coating showing a dispersion in a nickel-base alloy matrix of 60 wt.% coarse particles of coarse tungsten carbide (about 43.5 v/o) of average size of about 100 microns.

Referring to FIG. 2, a curve is shown plotting interparticle spacing against volume fraction. As will be noted, the curve becomes asymptotic with increase in volume fraction with respect to decrease in interparticle spacing. With interparticle spacings below 10 and preferably below 6 microns, the surface will act as if it were made of tungsten carbide and provide improved resistance to wear and abrasion. Tests have supported this position based on a hard faced coating containing about 16% by weight tungsten carbide (about 9 v/o) dispersed through a nickel-base alloy matrix containing by weight 16% Cr, 4.5% Si, 3.5% B, 4.5% Fe and the balance essentially nickel.

COMPOSITION OF MATTER

As stated hereinbefore, the invention provides as one embodiment a composition in the form of a powder mixture for use in the hard facing of metal substrates comprising a nickel-base alloy powder having substantially uniformly blended therewith a powder comprising agglomerates of nickel powder intimately combined with tungsten carbided powder, the amount of tungsten carbide in the agglomerates ranging from about 70% to 90% by weight, with the nickel powder in said agglomerates ranging from about 30% to 10% by weight, the ratio of the amount of agglomerates to said nickel-base alloy powder in the powder mixture being such that the total mixture has an average tungsten carbide content ranging from about 10% to 30% by weight of said mixture, the composition of the nickel-base alloy powder in the mixture comprising by weight about 2.5% to 20% Cr, about 0.5% to 6% Si, about 0.5% to 5% B, up to about 10% Fe and the balance essentially nickel.

A preferred tungsten carbide loading is a composition containing about 12% to 24% by weight of carbide based on the total weight of the mixture, a preferred matrix alloy composition being one containing by weight about 10% to 20% Cr, about 2% to 6% Si, about 1.5% to 5% B, up to 10% Fe and the balance essentially nickel. The weight ratio of nickel-tungsten carbide agglomerate powder to the nickel-base alloy powder in the mixture may range from about 0.15 to 0.5. It is preferred that atomized nickel-base alloy powder be used in formulating the mixture.

It is also preferred that the atomized nickel-base alloy powder have an average particle size less than 100 mesh (U.S. Standard) and the agglomerate powder be less than 150 mesh in size and, more preferably, less than 270 mesh. A desirable nickel-base alloy powder passing through 100 mesh is one in which at least 30% by weight passes through 325 mesh.

The nickel and tungsten carbide powders making up the agglomerates preferably have an average size ranging from about 0.1 to 10 microns each, for example, from 2 to 8 microns, and, more preferably, from about 2 to 6 microns each.

As stated herein, the agglomerates are made by employing a resin as a bonding agent, such as methyl methacrylate dissolved in methyl ethyl ketone. The amount of resin employed corresponds on a dry basis with respect to the total nickel plus tungsten carbide content of about 2% to 3% by weight following evaporation of the solvent. Broadly speaking, the amount of resin on the dry basis may range from about 1 to 5% to the total weight of nickel plus tungsten carbide being agglomerated.

Examples of resins which may be employed are the acrylates, e.g. methyl methacrylate, polyvinyl chloride, polyurethane, polyvinyl alcohol, isobutyl metacroid, and the like. The resins are employed as solutions, that is, dissolved in a compatible volatile organic solvent, such as alcohols, methyl ethyl ketone (MEK), xylol and the like and the solution in predetermined amounts mixed with the powdered ingredients and the solvent vaporized to leave behind bonded agglomerates which are sized by passing through a screen of 150 mesh and preferably through 270 mesh (U.S. Standard).

THE METHOD OF APPLYING THE COATING

As stated hereinbefore, the preferred method for applying the coating material to a metal substrate is that disclosed in U.S. Pat. No. 3,190,560. The powder blend employed is that in which the atomized nickel-base powder has an average size less than 270 mesh. As will be appreciated, other size ranges may be used as commonly employed in the metal spraying art.

Using a torch of the type disclosed in the aforementioned patent, the hard face coating may be applied using a one-step or a two-step process.

In the one-step process, the metal substrate which has a melting point of over about 1100° C and is selected from the group consisting of iron, nickel, cobalt and ironbase, nickel-base and cobalt-base alloys is cleaned of surface oxides and the substrate preheated to about 350° F to 500° F. The flame torch is adjusted to a neutral flame and the tip held approximately one inch from the substrate and a small amount of powder applied by spraying and heating continued until the small amount of powder wets out and bonds metallurgically to the substrate. This indicates that the bonding temperature has been achieved. The spraying process is continued until the proper thickness is obtained.

The two-step process is particularly useful in applying a thin coating on the substrate. The substrate is preheated and the torch then adjusted to a neutral flame. The powder is applied in a first step as a coating with the torch tip approximately 1 or 2 inches away from the surface. The powder is applied according to a predetermined thickness, taking into account shrinkage, and the applied coating then fused in a second step by bringing the torch tip to within one inch of the coated surface. The heating is continued until the coating melts and bonds metallurgically to the substrate.

Examples of metal substances include low-carbon and low-alloy steels, stainless steel, high alloy steels, nickel and cobalt superalloys, and the like.

THE WEAR AND ABRASION RESISTANT COATING

As stated herein, the metallurgically bonded coating produced in accordance with the invention is characterized metallographically by a substantially non-segregated structure. That is to say, the coating is characterized by a substantially uniform distribution of hard particles comprising tungsten carbides of average particle size ranging up to about 10 microns, e.g. 0.1 to 10 microns, and generally from about 2 to 8 microns, for example, ranging from about 2 to 6 microns, the latter size being preferred for optimum wear and abrasion resistance. The interparticle spacing for the majority of the particles should be below 15 microns and, more preferably, below 10 microns, for example, up to about 5 microns for particle sizes ranging from about 2 to 6 microns, at low carbide loadings. As previously stated, the carbide loading in the coating ranges from about 10% to 30% by weight (about 5 v/o to 20 v/o) and, more preferably, from about 12% to 24% by weight (about 6.5 v/o to 14 v/o). A loading of about 16% by weight (about 9 v/o) is particularly preferred.

As illustrative of the invention, the following example is given:

EXAMPLE

An agglomerated powder is produced by mixing 20% by weight of nickel powder of less than 10 microns in size with 80% tungsten carbide powder of about 2 to 6 microns average size in a volatile compatible organic solvent solution containing an amount of resin corresponding to about 2 to 3% by weight of the powder mixture on the dry basis. The mixing is carried out at a temperature not exceeding 140° C until dry. The dried material is passed through a 270 mesh screen to provide an agglomerate powder of substantially uniform size.

The foregoing agglomerated powder (20%) is blended with 80% by weight of an atomized nickel-base alloy powder of minus 140 mesh with at least 30% by weight of the powder passing through 325 mesh to provide a powder mixture containing about 16 wt.% of tungsten carbide, the nickel-base alloy powder assaying by weight 16% Cr, 4.5% Si, 3.5% B, 4.5% Fe and the balance essentially nickel.

The powder mixture is sprayed onto a metal substrate of 1020 steel with a gas torch of the type illustrated in U.S. Pat. No. 3,190,560, the nickel-base alloy in the mixture having a liquidus temperature of about 1900° F (1038° C) and a solidus temperature of about 1790° F (975° C). The tungsten carbide particles do not fuse or melt during travel through the flame but are trapped in the matrix due to the intimate combination of the carbide particles with the nickel powder in the agglomerates, the nickel powder promoting wetting of carbide particles. The oxyacetylene flame provides a temperature in the range of about 5000° F to 6500° F (2760° C to 3593° C). The powder is deposited through the flame, the low melting nickel-base alloy melting and forming a molten puddle on the metal surface, the nickel in the agglomerate dissolving in the melt and effecting wetting of the trapped tungsten carbide particles. The deposit after solidifcation forms a continuous metallurgical bond with the metal substrate. The deposited layer is increased in thickness by depositing thereon one or more additional overlays, depending on the end use.

The coating produced exhibits a substantially non-segregated uniform dispersion of tungsten carbide of average size ranging from about 2 to 6 microns at an average interparticle spacing ranging up to about 5 microns.

A typical coating produced in the foregoing manner was subjected to a wear and abrasion resistant test using the system shown in FIG. 7 of the drawing.

Referring to the drawing, a wear measuring device is shown comprising a hopper 10 located above a rotatable wheel 12 having a resilient rubber tire 12A bonded thereto at the periphery thereof, said wheel being arranged adjacent a sample holder 14A forming a leg connected at right angles to lever arm 14, the extreme right end of which is pivotally supported at fulcrum 15, the leg or sample holder being located near the pivot but intermediate the free end and the pivotally mounted end of the lever arm.

The free end of the lever arm supports a weight 16 which is located 16 inches from the pivot end thereof for applying pressure to sample 13 in contact with the periphery of rubber wheel 12A.

The hopper contains hard particles of material, e.g. silica ($SiO_2$) or silicon carbide (SiC) and the like which are fed via the opening of gate 10A down chute 11 which is inclined relative to the horizontal axis of the lever arm and extends to the surface of the sample and is adapted to feed a steady flow of hard particles to said sample 13 mounted on leg 14A in tangential contact with rubber wheel 12A by virtue of weight 16, the hard particles being fed into the bite formed between the contacting surface of the sample and the wheel, the hard particles 17 being shown emitting downwardly therefrom after passing through the bite area in frictional contact with the surface of the sample.

Using the foregoing testing system, tests (Test A and Test B) were conducted comparing a coating with a high loading (approximately 50 wt.%) of coarse particles of tungsten carbide (average size of about 60 to 100 microns) with the coating of the invention containing a very low loading of 16 wt.% of tungsten carbide of average particle size of 4 to 6 microns, the matrix in both coatings being a nickel-base alloy containing 16% Cr, 4.5% Si, 3.5% B, 4.5% Fe and the balance essentially nickel. The coating with the coarse particles of tungsten carbide was determined to have a density of approximately 12.1 grams/cm³ and the coating of the invention with the fine particles of tungsten carbide a density of about 8.8 grams/cm³.

Each test, which was conducted in duplicate, was carried out for a specified time period after which the test sample is weighed to determine the weight loss of the sample. The weight loss is converted to volume loss, and a wear factor determined as measured by the reciprocal of the volume lost in cubic centimeters. The tests which were conducted are as follows:

TEST A

Test Parameters

Silica sand (−20 + 40 mesh)
Test time: 30 minutes
Flow rate of sand: 1 lb/minute The silica abrasive which is quite coarse is carried via chute 11 to the bite between the sample 13 and rubber wheel 12A, the specimen being pressurized against the abrasive and the wheel by the fixed weight 16 weighing 12 lbs. supported 16 inches from the fulcrum.

The results obtained are as follows:

|  | Coarse WC (about 50 wt%) + NiCrB Si | | Fine WC (about 16 wt%) + NiCrB Si | |
|---|---|---|---|---|
| Test Nos. | 1 | 2 | 1A | 2A |
| Wt. Loss (grams) | 0.14 | 0.135 | 0.065 | 0.0744 |
| Wear Factor (Reciprocal of Vol.) | 86 | 89 | 150 | 135 |

Since the wear factor is a function of the reciprocal of the volume lost during the test, then it follows that the higher the wear factor, the greater is the resistance to wear and abrasion.

This will be apparent by comparing duplicate tests 1 and 2 (outside the invention) with duplicate tests 1A and 1B (within the invention). As will be further apparent, the coating of the invention shows at least a 70% improvement over the wear characteristics of the coating outside the invention which, as stated hereinbefore, tends to have a segregated structure which exposes more matrix metal to the abrasive wear material, whereas the coating within the invention has a uniform dispersion of small sized tungsten carbide particles (4 to 6 microns) at very close interparticle spacings of up to 5 microns.

TEST B

Test Parameters

| Silicon carbide | minus 140 mesh |
|---|---|
| Test Time | 10 minutes |
| Flow rate | 0.5 lb/minute |

The method employed was the same as Test A except that a much finer and harder abrasive was used at a lower flow rate for a time period of 10 minutes. The following results were obtained:

|  | Coarse WC (about 50 wt.%) + NiCrBSi | | Fine WC (about 16 wt.%) + NiCrBSi | |
|---|---|---|---|---|
| Test Nos. | 3 | 4 | 3A | 4A |
| Wt. loss (grams) | 0.37 | 0.35 | 0.049 | 0.042 |
| Wear Factor (Reciprocal of Vol.) | 32 | 34 | 200 | 220 |

The foregoing test is a more sensitive test since a finer and harder abrasive is used which selectively wears away the exposed matrix between the coarse particles in tests 3 and 4, since the interparticle spacing is larger than the spacing in the coating of the invention in tests 3A and 4A. This is clearly apparent from the fact that the test results of 3A and 4A (within the invention) show over five times greater resistance to wear and abrasion as compared to the highly loaded tungsten carbide coating of tests 3 and 4.

As has been stated herein, the advantage of using finer and less carbides is that the coating is more ductile, is less sensitive to thermal cracking because of the high content of matrix metal (70% to 90% by weight) and, moreover, because of its ductility, exhibits improved resistance to impact.

When it is stated herein that the final coating contains a dispersion of tungsten carbide, it is understood that the particles may not necessarily be pure tungsten carbide, since the tungsten carbide may form a more complex carbide by reaction with some of the elements in the matrix, such as chromium which is known to be a carbide former. However, the hard particles will generally comprise substantially tungsten carbide.

The term "substantially non-segregated" when used with respect to the distribution of tungsten carbide particles in the matrix at or to a depth of about 500 microns below the surface of the coating when viewed metallographically at 100 times magnification means that the statistical average of the interparticle spacings between the hard particles is below 15 microns and, preferably, up to about 10 microns.

The microstructure of the coating is examined in the etched condition, the etchant comprising a water solution of approximately 10% by weight $K_3Fe(CN)_6$ and approximately 10% by weight KOH or NaOH, the etching being carried out for about 30 seconds.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of hard facing a metal substrate with an alloy coating material adapted to impart improved resistance to wear and abrasion to said metal substrate which comprises, flame spraying a fusible powder mixture onto a metal substrate by means of a flame-spraying torch, said powder mixture comprising an atomized nickel-base alloy powder of minus 100 mesh having substantially uniformly blended therewith a powder comprising agglomerates of nickel powder intimately combined with tungsten carbide powder, said agglomerates being minus 150 mesh in size, the nickel powder and tungsten carbide powder in said agglomerates each having an average particle size ranging from about 0.1 to 10 microns, the amount of tungsten carbide in said agglomerates ranging from about 70% to 90% by weight, with the nickel powder in said agglomerates ranging from about 30% to 10% by weight, the ratio of said agglomerates to said nickel-base alloy powder in said mixture being such that the total mixture has an average tungsten carbide content of about 10% to 30% by weight, the composition of said nickel-base alloy powder in said mixture comprising by weight about 2.5 to 20% Cr, about 0.5% to 6% Si, about 0.5% to 5% B, up to about 10% Fe and the balance essentially nickel, maintaining a flame on said deposited hard facing alloy to assure a molten deposit on said substrate, and then allowing said molten deposit to solidify, whereby a hard coating is obtained metallurgically bonded to said metal substrate characterized metallographically by a substantially fine uniform dispersion of hard particles comprising tungsten carbide of average size not exceeding 10 microns dispersed through a nickel-base alloy matrix at an average interparticle spacing of less than about 15 microns.

2. The method of claim 1, wherein the average particle size of each of said nickel and said tungsten carbide in said agglomerate prior to spraying ranges from about 2 to 8 microns.

3. The method of claim 2, wherein the total powder mixture prior to spraying has an average tungsten carbide composition of about 12% to 24% by weight of said mixture.

4. The method of claim 3, wherein the atomized nickel-base alloy in said mixture prior to spraying contains by weight about 10% to 20% Cr, about 2% to 6% Si, about 1.5% to 5% B, up to about 10% Fe and the balance essentially nickel.

5. The method of claim 4, wherein the deposited coating is characterized metallographically by hard particles comprising tungsten carbide of average size not exceeding about 6 microns and an average interparticle spacing in said nickel-base alloy matrix of less than 10 microns.

* * * * *